（12）United States Patent
Yuzuriha et al.

(10) Patent No.: US 7,093,808 B2
(45) Date of Patent: Aug. 22, 2006

(54) CLAMP HOLDER

(75) Inventors: Chiaki Yuzuriha, Aichi (JP); Hiroyoshi Mori, Aichi (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/353,166

(22) Filed: Jan. 28, 2003

(65) Prior Publication Data

US 2003/0140462 A1    Jul. 31, 2003

(30) Foreign Application Priority Data

Jan. 29, 2002    (JP) .............................. 2002-019564

(51) Int. Cl.
*E21F 17/02*    (2006.01)
(52) U.S. Cl. ............................ 248/62; 248/65; 248/73; 248/74.1; 285/242; 24/20 R
(58) Field of Classification Search ................. 248/62, 248/65, 67.7, 73, 74.1, 74.2, 75, 79; 285/23, 285/242, 252; 24/20 R, 20 S, 16 PB, 16 R, 24/22, 23 R, 23 W, 20 CW
See application file for complete search history.

(56) References Cited

U.S. PATENT DOCUMENTS

| 3,521,332 | A | * | 7/1970 | Kramer ....................... 403/188 |
| 4,094,483 | A | * | 6/1978 | Busch .......................... 248/73 |
| 4,306,697 | A | * | 12/1981 | Mathews ..................... 248/68.1 |
| D264,682 | S | * | 6/1982 | Van Doren ................... D8/354 |
| 5,018,260 | A | * | 5/1991 | Ziu .............................. 24/555 |
| 5,209,441 | A | * | 5/1993 | Satoh ......................... 248/74.2 |
| 5,675,871 | A |   | 10/1997 | Webb et al. |
| 5,820,166 | A |   | 10/1998 | Webb |
| 6,216,987 | B1 | * | 4/2001 | Fukuo ........................ 248/74.2 |
| 6,343,772 | B1 | * | 2/2002 | Oi ............................... 248/75 |
| D483,654 | S | * | 12/2003 | Taylor .......................... D8/356 |
| 6,701,581 | B1 | * | 3/2004 | Senovich et al. ........... 24/20 R |
| 2001/0042813 | A1 | * | 11/2001 | Taylor .......................... 248/75 |
| 2004/0056158 | A1 | * | 3/2004 | Stuart et al. ............... 248/74.2 |

FOREIGN PATENT DOCUMENTS

| JP | 5-87391 A1 | 11/1993 |
| JP | 2001-141154 A1 | 5/2001 |

* cited by examiner

*Primary Examiner*—Korie Chan
(74) *Attorney, Agent, or Firm*—Darby & Darby

(57) ABSTRACT

In a holder having a holder base and holding arms and used for holding a hose clamp in position, the holder base is so constructed as to be capable of being positioned on the outer periphery of an annular hose clamp and a pair of holding arms protrude from each of a pair of opposite lateral edges of the holder base. Each pair of holding arms are so shaped as to define a pair of opposed arcs extending along a circumference A having a diameter somewhat smaller than the outside diameter of a hose. Each holding arm has a sharp projection B1 formed on its inner peripheral surface at its distal end and directed substantially toward the center of the circumference A, or more inwardly than it. The clamp holder facilitates the preliminary holding of a hose clamp in position on a hose without damaging the hose, and without slipping off the hose or being displaced easily.

19 Claims, 8 Drawing Sheets

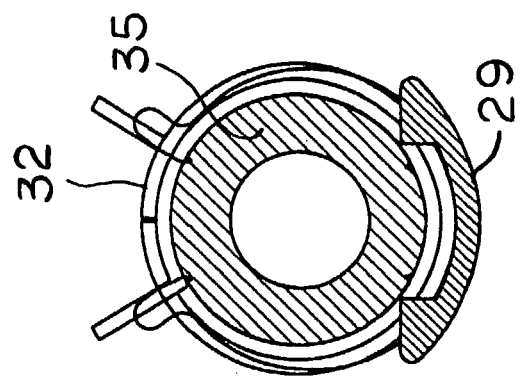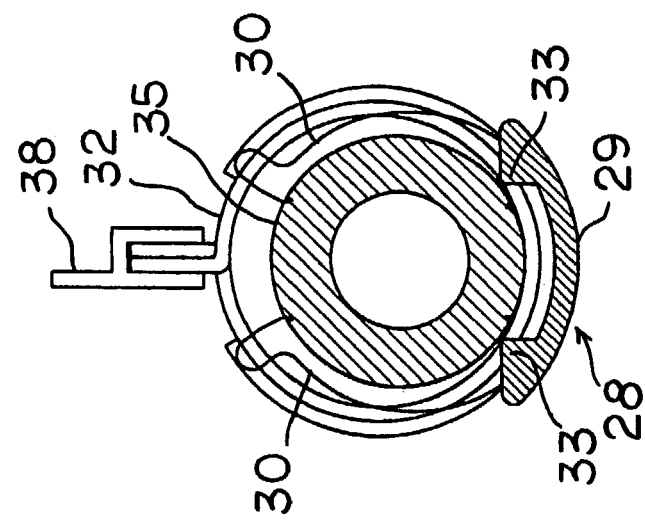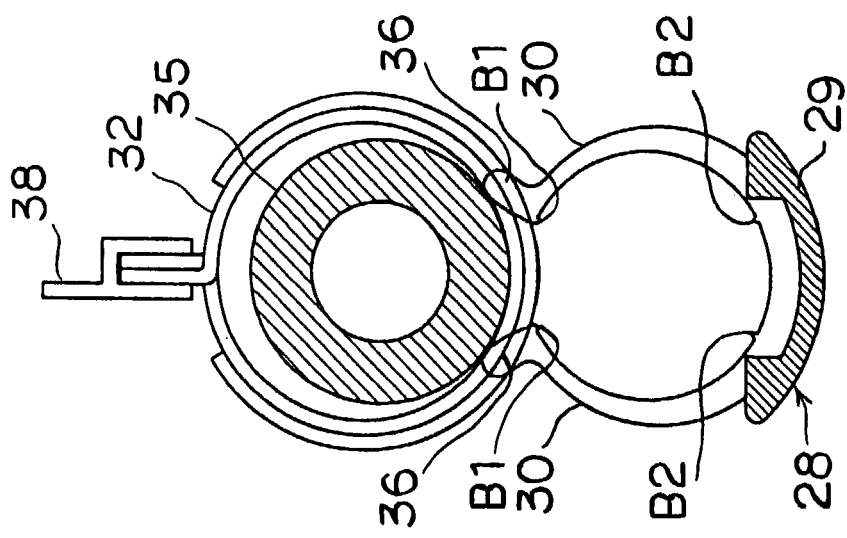

CLAMP HOLDER

BACKGROUND OF THE INVENTION

1. Field of the Invention

This invention relates to a clamp holder. More particularly, this invention relates to a clamp holder for the preliminary fixing of a diametrically expanded hose clamp on a hose portion expected to be clamped at its joint with a pipe.

2. Description of the Related Art

It has hitherto been usual to carry out a pipe joining process for joining a rubber hose, etc. to a hard pipe and fixing their joint tightly with a hose clamp, as will be described below by way of example. A hose clamp 2 held in a diametrically expanded form by a stopper pin, etc. is fitted about a pipe 1 beforehand, as shown in FIG. 1A. Then, a hose 3 is joined with the pipe 1, and the hose clamp 2 is moved and positioned about their joint, as shown in FIG. 1B. Then, the hose clamp 2 is released from its diametrically expanded form to fix the joint tightly at a selected point. This method has, however, been low in working efficiency, since it necessitates the steps of moving the hose clamp and positioning it accurately in a busy pipe joining process. It has also been a useless effort to have to affix a clamp positioning mark on the hose for the accurate positioning of the hose clamp.

Therefore, the work becomes efficient if sub-assembly is carried out for the preliminary fixing of a diametrically expanded hose clamp on a hose portion expected to be clamped. A process for joining a hose to a pipe is completed only if a step of e.g. removing a stopper pin is taken to release the hose clamp from its diametrically expanded form after joining the hose.

U.S. Pat. No. 5,675,871, for example, discloses a clamp holder 6 as shown in FIG. 2. The clamp holder 6 has a base plate 4 adapted to engage the outer peripheral surface of a hose clamp and ring-shaped arms 5 for holding a hose. After the clamp holder 6 is fitted about the outer periphery of the hose clamp 7 in its diametrically expanded form, the hose 8 is inserted axially therethrough, as shown in FIG. 3. The arms 5 hold the hose 8 for the preliminary fixing of the hose clamp 7 on that portion of the hose 8 which is expected to be clamped.

U.S. Pat. No. 5,820,166 discloses a clamp holder 13 as shown in FIG. 4. The clamp holder 13 comprises a C-shaped curved base plate 10 adapted to engage the outer peripheral surface of a hose clamp 9 and having engaging projections 11 and sharp projections 12 formed on its inner peripheral surface. The base plate 10 has its gap widened to force the clamp holder 13 radially into engagement about the outer periphery of the hose clamp 9 fitted on a selected portion of a hose 14. The projections 11 are engaged in the openings or slots 15 of the hose clamp 9 to assemble the clamp holder 13 with the hose clamp 9, as shown in FIG. 5. At the same time, the sharp projections 12 engage positively with the outer peripheral surface of the hose 14 to fix the hose clamp 9 preliminarily on that portion of the hose 14 which is expected to be clamped.

JP-UM (utility model application)-A-5-87391 discloses a clamp holder 16 as shown in FIG. 6. The clamp holder 16 is a substantially semi-circular curved leaf spring and has positioning members 17 and 18 formed at its opposite ends. The positioning members 17 and 18 are engaged in the openings or slots of a hose clamp 19 to assemble the clamp holder 16 with the hose clamp 19. At the same time, the positioning members 17 and 18 engage tightly with the outer peripheral surface of a hose 20 to fix the hose clamp 19 preliminarily on that portion of the hose 20 which is expected to be clamped.

JP-A-2001-141154 discloses a clamp holder 21 as shown in FIG. 7. The clamp holder 21 has an attachment base 23 having projections 22 adapted to engage in the openings or slots of a hose clamp and a pair of arch-shaped arms 24 formed along the attachment base 23. The arms 24 have arcuately curved legs terminating in outwardly standing guides 25. The clamp holder 21 is pushed in the direction of the guides 25 and assembled with the hose clamp 27 held in its diametrically expanded form and having a hose 26 passed therethrough, as shown in FIGS. 8A and 8B. As a result, the arch-shaped arms 24 extend over the hose clamp 27. The arcuate legs of the arms 24 hold the hose 26, so that the hose clamp 27 may be preliminarily fixed on that portion of the hose 26 at which it will be clamped.

According to U.S. Pat. No. 5,675,871, the hose 8 is held by the C ring-shaped arms 5 extending about a circumferential range of 270° or more in a form of sub-assembly. Therefore, there is no fear of the clamp holder 6 slipping off the hose 8. It is, however, necessary to insert the hose 8 axially through the clamp holder 6 and hose clamp 7 put together. The problem is that the ring-shaped arms 5 are somewhat smaller in diameter than the hose 8 and make it impossible to insert the hose 8 easily.

Moreover, the force with which the hose clamp 7 is held in position on the hose 8 is weak, since it relies upon the frictional resistance between the arms 5 and the hose 8. The contact of the clamp holder 6 or the hose clamp 7 with another object is likely to cause the displacement of the hose clamp 7. Such displacement is particularly likely to occur as rotation around the hose, though it may also occur along the hose. In either event, such displacement usually requires troublesome correction in a pipe joining process.

According to JP-A-2001-141154, only the hose clamp 27 is inserted about the hose 26 beforehand and the clamp holder 21 is forced diametrically into engagement about the hose clamp 27 and the hose 26. Therefore, their sub-assembly is easy. The force with which the hose clamp is held in position on the hose 26 is, however, not strong enough, since it relies upon the frictional resistance produced when the hose 26 is held by a pair of arch-shaped arms 24. Moreover, the arch-shaped arms 24 projecting over the hose clamp 27 and the outwardly standing guides 25 formed at the ends of the arch-shaped arms 24 are likely to cause the displacement, etc. of the hose clamp 27 by contacting another object.

According to U.S. Pat. No. 5,820,166, the C-shaped curved base plate 13 is adapted to combine with the hose clamp 9 and hold it in position on the hose 14. Therefore, the base plate 13 is required to have a sufficiently large spring strength not to slip off the hose 14, while the sharp projections 12 engage so strongly with the hose 14 as to damage it. Moreover, the sharp projections 12 protrude outwardly (toward the opening of the base plate). Therefore, the sharp projections 12 damage the outer periphery of the hose 14 when the base plate 13 is forced into engagement with the hose clamp 9 and the hose 14. Moreover, the sharp projections 12 are not satisfactory for preventing any rotational displacement of the hose clamp 9, since all of a total of four projections 12 are directed outwardly and engage with only the upper half portion of the hose 14.

The device of JP-UM-A-5-87391 is similar to the invention of U.S. Pat. No. 5,820,166, but differs from it in having instead of the sharp projections 12 the positioning members 17 and 18 adapted to make surface contact with the hose 20.

This makes it possible to avoid damage to the hose 20, but also weakens the force with which the hose clamp is held in position on the hose 20. Moreover, it appears from the combination of the hose clamp 19 and the clamp holder 16 as put together that the positioning members 17 and 18 of the clamp holder 16 come off the hose clamp 19 easily in a form of their sub-assembly. If they are so designed as not to come off easily, they are likely to interfere with the tightening of the hose clamp 19 in a pipe joining process and it is, therefore, undesirably essential to remove the clamp holder 16 in a pipe joining process.

SUMMARY OF THE INVENTION

It is an object of this invention to facilitate the sub-assembly of a hose clamp as required for its preliminary fixing in position on a hose. It is another object of this invention to ensure that a hose clamp in a form of sub-assembly be held against any displacement, or slipping off a hose as a result of e.g. its contact with another object. It is still another object of this invention to provide a clamp holder that is unlikely to damage a hose formed from e.g. rubber.

According to a first aspect of this invention, there is provided a clamp holder for fixing a hose clamp in position, comprising a holder base and holding arms that are formed from an elastically deformable material, wherein the holder base is so constructed as to be capable of being positioned on the outer periphery of an annular hose clamp, and the holding arms consist of a pair of holding arms protruding from each of a pair of lateral edges of the holder base and forming opposed arcs lying along a circumference A having a diameter somewhat smaller than the outside diameter of a hose, each holding arm having a sharp projection B1 formed on the inner peripheral surface of its distal end and directed toward substantially the center of the circumference A or more inwardly than it.

In the first aspect as set forth above, the "projection directed more inwardly than toward substantially the center of the circumference A" means a projection protruding more downwardly than toward substantially the center of the circumference A when the clamp holder is so placed as to have the holder base at its bottom and the distal ends of the holding arms at its top.

The clamp holder according to the first aspect is assembled by forced engagement in a diametrical direction with a hose clamp having a hose passed therethrough. Accordingly, sub-assembly for the preliminary fixing of a hose clamp on a selected hose portion is easier to carry out than by, for example, the invention of U.S. Pat. No. 5,675,871.

The clamp holder according to the first aspect holds a hose clamp in position by the indenting engagement of the sharp projections B1 on the inner peripheral surfaces of the distal ends of the holding arms with a hose. Therefore, it produces a satisfactorily strong holding force for the hose clamp as compared with, for example, the invention of U.S. Pat. No. 5,675,871 or the device of JP-UM-A-5-87391.

Moreover, the clamp holder according to the first aspect has its sharp projections B1 directed substantially toward the center of the circumference A or more inwardly than it, as compared with, for example, the invention of U.S. Pat. No. 5,820,166. Therefore, it is possible to restrain any damaging of a hose effectively during the attachment of a hose clamp, and it is also possible to prevent any slipping of a hose off the hose clamp effectively even if the holding arms may not have a high spring strength. Accordingly, it is possible to design the holding arms with a low spring strength to thereby reduce any damaging of a hose by the sharp projections B1.

Moreover, the clamp holder according to the first aspect does not have its holding arms formed like an arch extending over a hose clamp, as opposed to the invention of JP-A-2001-141154. Therefore, there is less fear of the hose clamp being displaced as a result of any of the holding arms contacting another object.

According to a second aspect of this invention, each of the holding arms according to the first aspect as set forth above is formed with a smaller width than the holder base, and/or, with a smaller width and/or thickness toward its distal end.

The second aspect makes it easy to design the holding arms with a particularly low spring strength. Moreover, the inwardly directed sharp projections B1 ensure the effective retaining of a hose against slipping off a hose clamp.

According to a third aspect of this invention, the opposed holding arms according to the first or second aspect as set forth above form an arc ranging from 280° to 320°.

According to the third aspect, the opposed holding arms having a narrow arcuate gap therebetween enable a still more effective retaining of a hose by the inwardly directed sharp projections B1. Moreover, if the invention of U.S. Pat. No. 5,820,166 or the device of JP-UM-A-5-87391 had a narrow arcuate gap, the clamp holder having a high spring strength would be difficult to fit forcedly on a hose. According to the third aspect, however, such forced fitting is easy, since the holding arms forming the arc has a low spring strength.

According to a fourth aspect of this invention, each of the holding arms according to any of the first to third aspects as set forth above has a guide formed on its distal end and protruding radially outwardly from the circumference A.

The guides formed on the distal ends of the holding arms according to the fourth aspect make the forced fitting of the clamp holder on a hose still easier.

According to a fifth aspect of this invention, the distal ends of the guides according to the fourth aspect as set forth above are of such a height that the guides do not protrude above the outer peripheral surface of a hose clamp assembled with the clamp holder.

The fifth aspect makes it possible to prevent substantially any displacement of the hose clamp by the contact of any guide with another object. No such guide as according to the fifth aspect is formed if the holding arms are formed like an arch extending over a hose clamp, as is the case with the invention of JP-A-2001-141154.

According to a sixth aspect of this invention, each of the holding arms according to any of the first to fifth aspects as set forth above has a sharp projection B2 formed on its inner peripheral surface toward its base end and directed toward substantially the center of the circumference A or more outwardly than it.

In the sixth aspect, the "projection directed more outwardly than toward substantially the center of the circumference A" means a projection protruding more upwardly than toward substantially the center of the circumference A when the clamp holder is so placed as to have the holder base at its bottom and the distal ends of the holding arms at its top.

According to the sixth aspect, the inwardly directed sharp projections B1 formed on the distal ends of the holding arms and the outwardly directed sharp projections B2 formed toward the base ends of the holding arms make indenting engagement with the outer periphery of a hose in mutually opposed directions. Accordingly, they are very effective for preventing any rotational displacement of a hose clamp about a hose.

According to a seventh aspect of this invention, the sharp projections B2 according to the sixth aspect as set forth above are situated substantially diagonally of the sharp projections B1 on the opposite holding arms on the circumference A.

The effectiveness of the sixth aspect as set forth above is particularly large if the sharp projection B2 on one of the holding arms is so formed as to satisfy the positional relationship according to the seventh aspect to the sharp projection B1 on the opposite holding arm.

According to an eighth aspect of this invention, the sharp projections B1 and/or B2 according to any of the first to seventh aspects as set forth above are each a small projection having a height that is substantially equal to the depth of a depression that may be formed in an outer rubber or elastomer layer of a hose when it is pressed against it.

If a relatively small projection is pressed against the outer periphery of a hose that is formed from a rubber or like material, that portion forms a local depression. According to the eighth aspect, therefore, it follows that the inner peripheral surfaces of the arcuate holding arms are pressed against the outer periphery of a hose simultaneously with the indenting engagement of the sharp projections B1 and/or B2 with the outer periphery of the hose. As a result, it is possible to obtain simultaneously the holding effect of the clamp holder owing to the sharp projections B1 and B2 and the holding effect of the clamp holder owing to the surface contact of the holding arms. Thus, the displacement of the clamp holder is particularly unlikely to occur.

The above and other advantages of this invention will become more apparent in the following description and the accompanying drawings.

BRIEF DESCRIPTION OF THE DRAWINGS

FIGS. 11A, 11B and 11C show the way in which the clamp holder embodying this invention is used.

DETAILED DESCRIPTION OF THE INVENTION

[Clamp Holder]

Figure 1A:
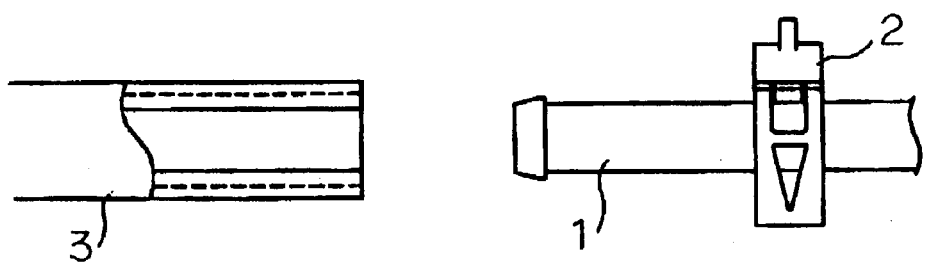
FIGS. 1A and 1B show the way in which a known hose clamp is used.
Figure 1B:
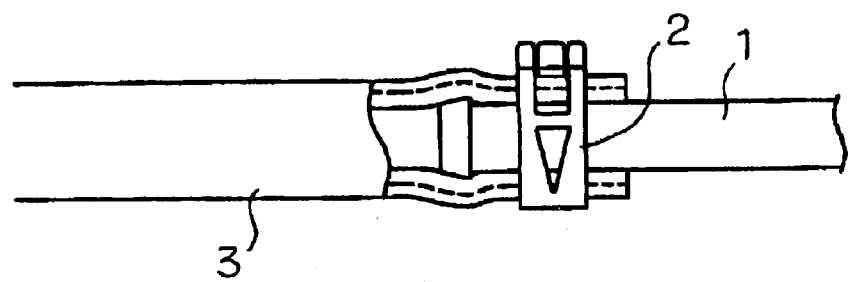
Figure 2:
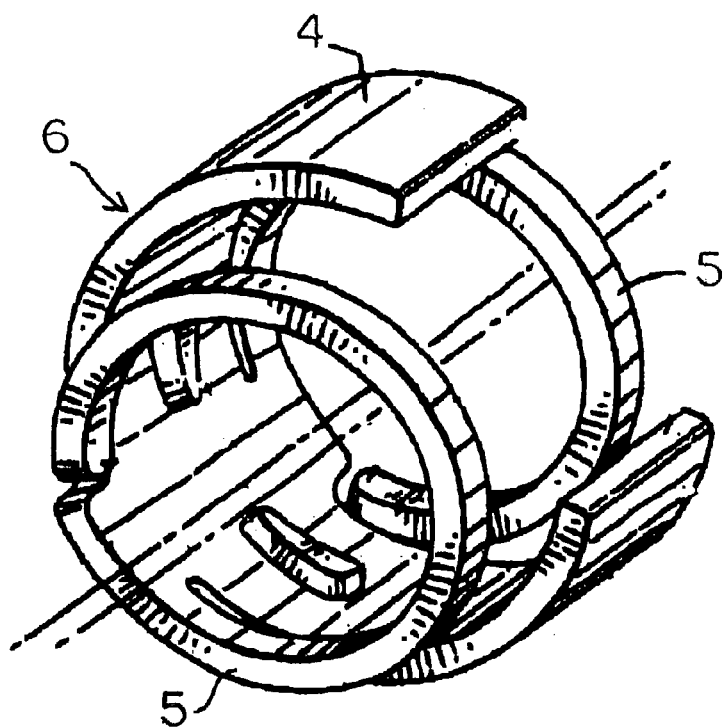
FIG. 2 shows a known clamp holder.
Figure 3:
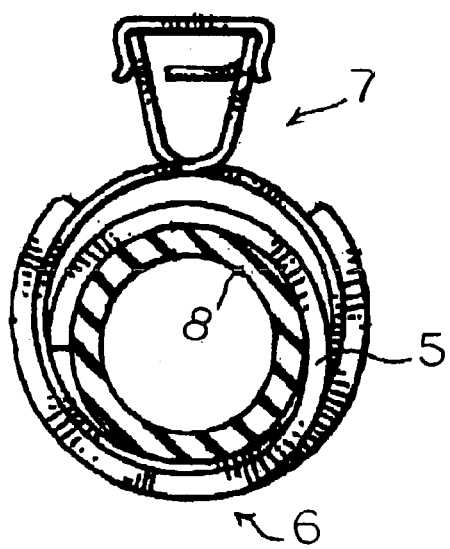
FIG. 3 shows the way in which the clamp holder of FIG. 2 is used.
Figure 4:
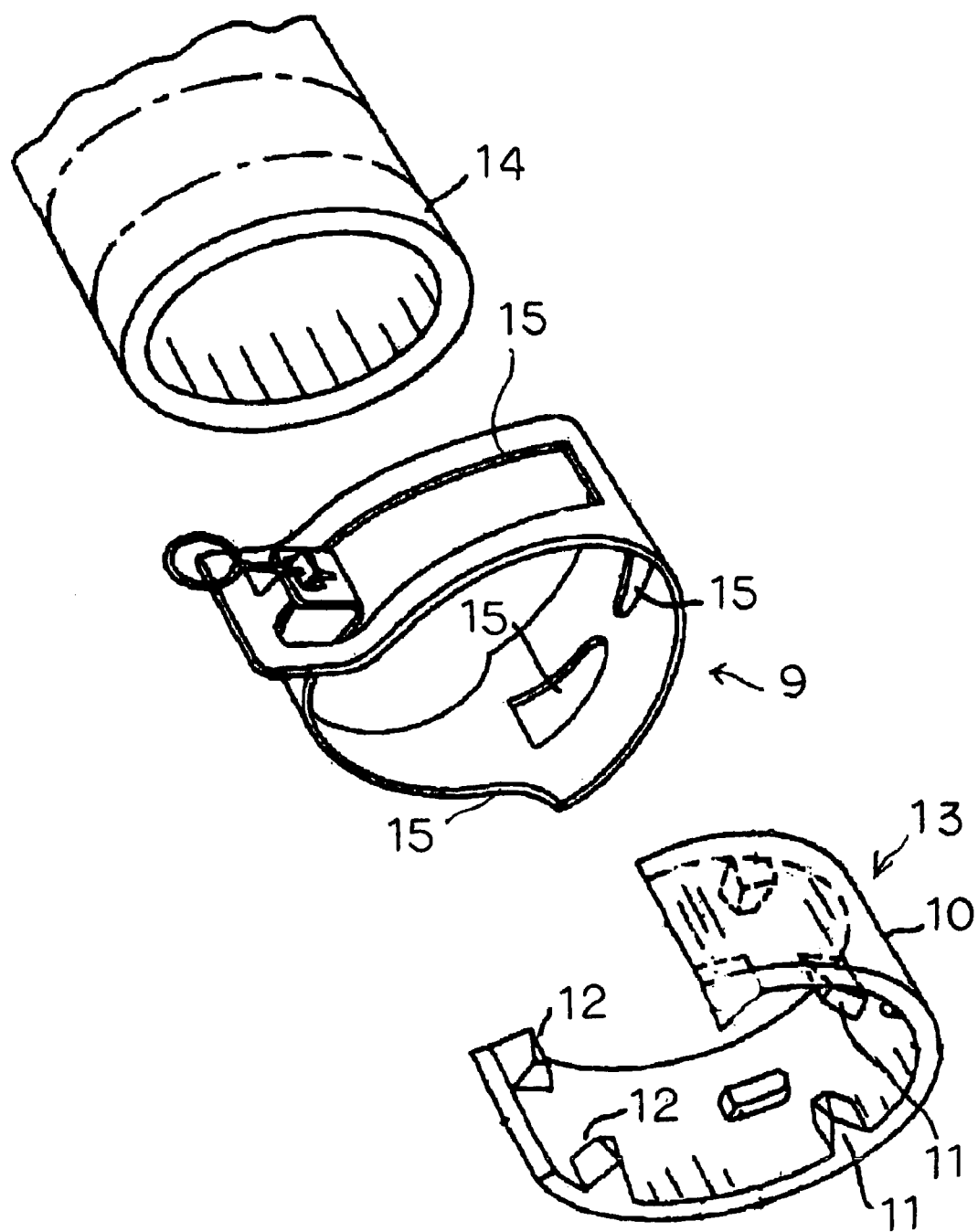
FIG. 4 shows another known clamp holder.
Figure 5:
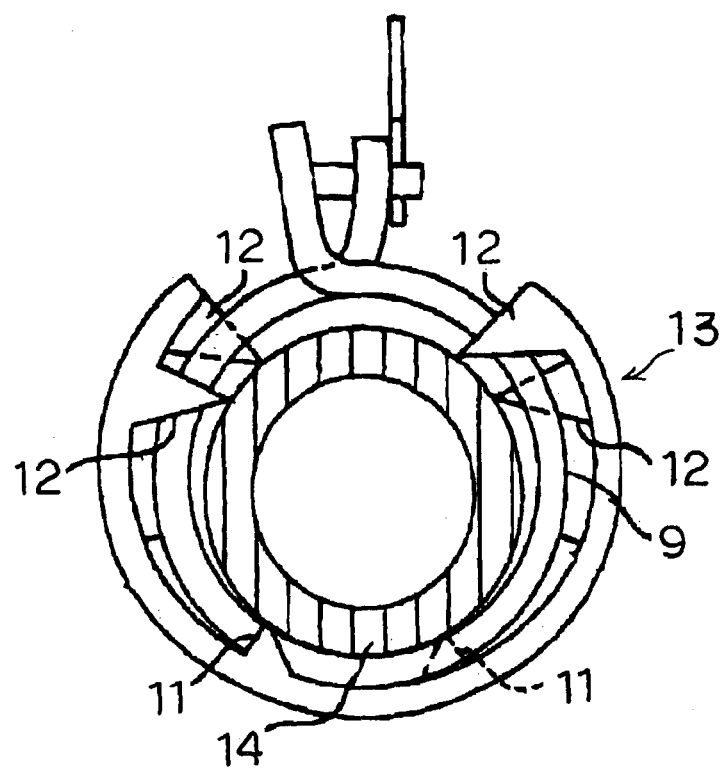
FIG. 5 shows the way in which the clamp holder of FIG. 4 is used.
Figure 6:
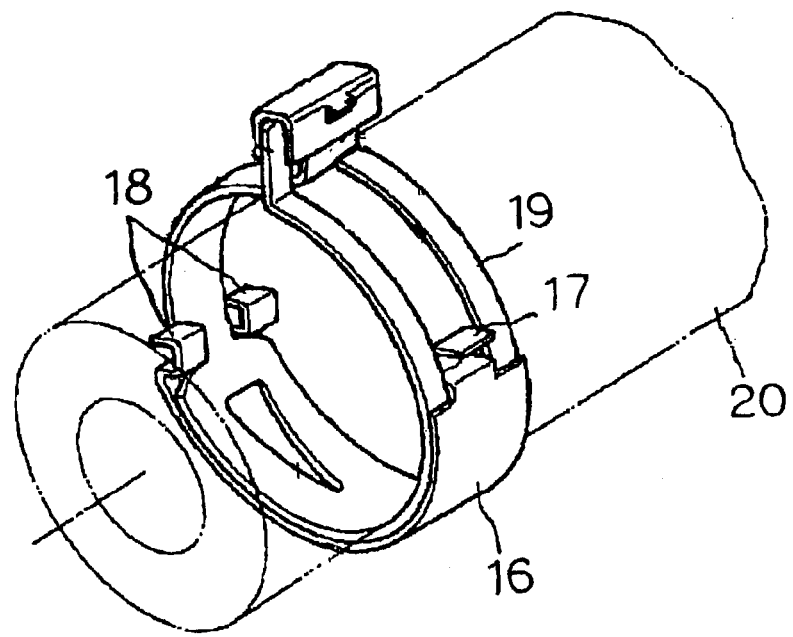
FIG. 6 shows the way in which still another known clamp holder is used.
Figure 7:
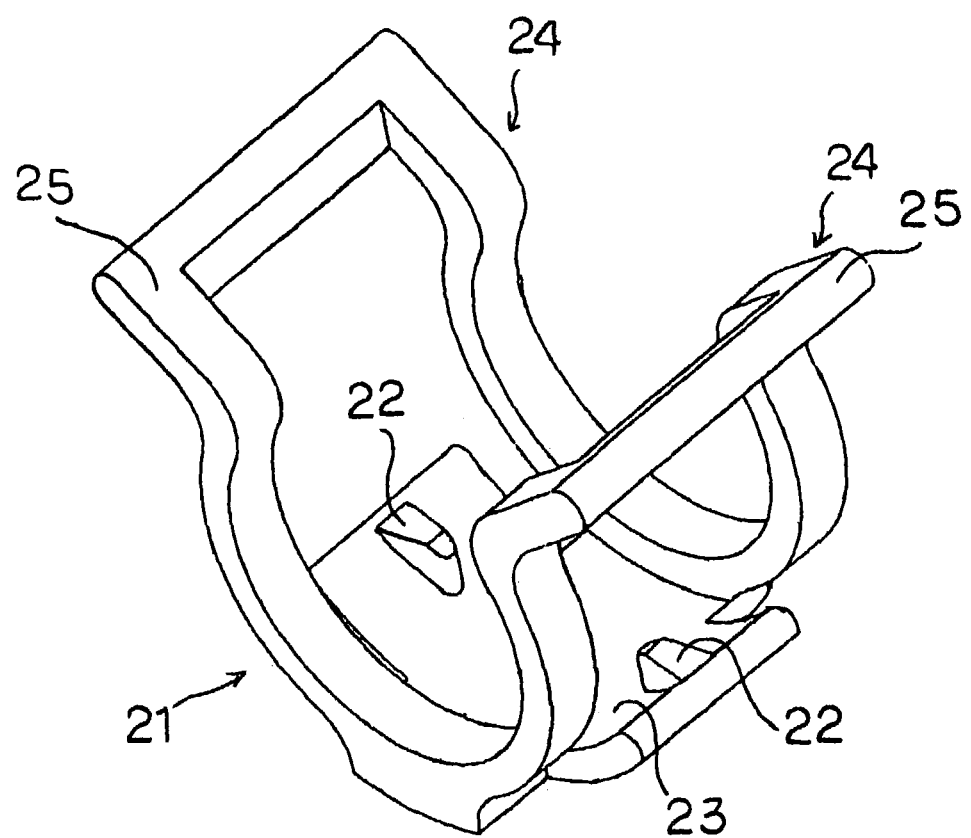
FIG. 7 shows a still different known clamp holder.
Figure 8A:
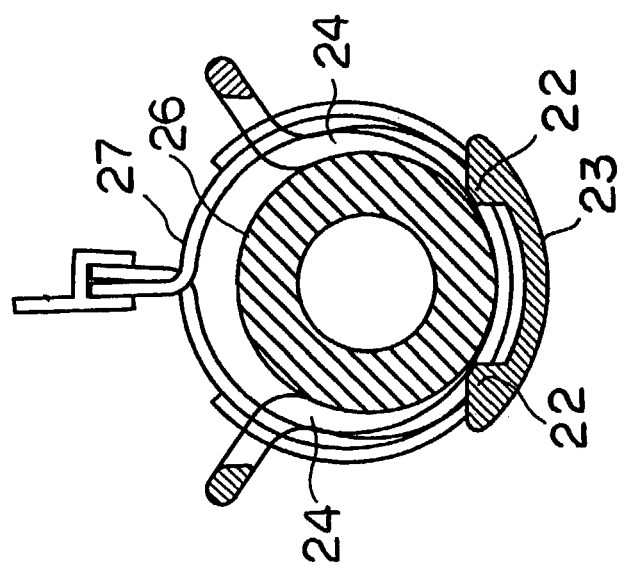
FIGS. 8A and 8B show the way in which the clamp holder of FIG. 7 is used.
Figure 8B:
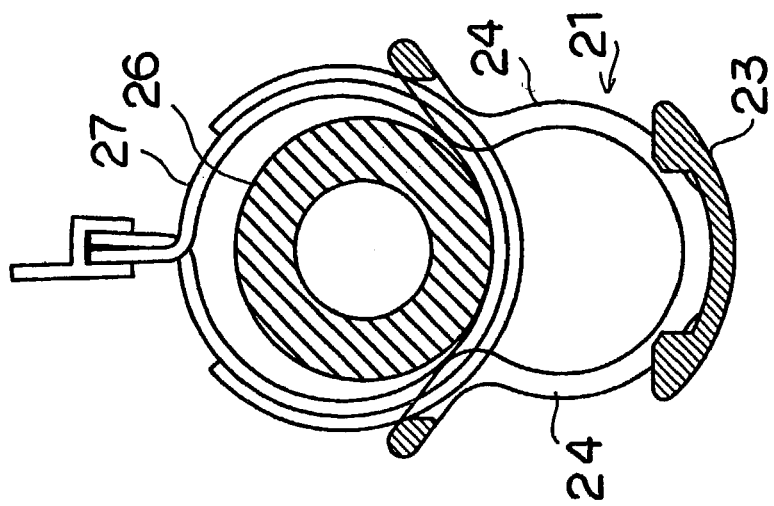

The clamp holder according to this invention has at least a holder base and holding arms. The holder base and holding arms are usually formed from the same elastically deformable material as a unitary structure like a unitary molded product of e.g. a plastic material, or steel. It is, however, not essential to form the holder base from an elastically deformable material. It is, therefore, possible to make a clamp holder by combining, for example, holding arms formed from an elastically deformable material and a holder base formed from a material having no elastic deformability.

The hose clamp to be associated with the clamp holder according to this invention may be of any type or construction if it meets the conditions as set forth at 1) and 2) below. It is preferable for the hose clamp to meet the condition as set forth at 3) below, too.

1) It is formed in an annular shape from a spring material;
2) It can be held in a diametrically expanded form by any appropriate device, such as a stopper pin; and
3) It has holes or slots in which projections formed on the holder base are engageable.

This invention does not impose any limitation on the hose to be employed for a sub-assembly, or its construction or use. For example, it is preferably applied to any of various kinds of hoses, such as oil, fuel, refrigerant and air hoses for a motor vehicle. In addition, it is preferably applied to a hose of any type, construction or use if the preliminary fixing of a hose clamp thereon is desirable. The hose preferably has at least its outer periphery formed from rubber or elastomer.

[Holder Base]

According to this invention, the holder base is a part having the function of attaching the clamp holder to a diametrically expanded hose clamp. Accordingly, the holder base is of any construction that enables it to be positioned on the outer periphery of an annular hose clamp. Although its construction is not limited, the holder base may, for example, have at least one attaching (or positioning) projection that is engageable in a hole and/or a slot in a hose clamp.

The holder base is required to have the attaching function as described above and the function of supporting the bases of the holding arms. Accordingly, the holder base is not limited in shape or construction unless it is prevented from performing those two functions. It is, however, preferable for the holder base to have a curved surface that can be brought into intimate contact with the outer periphery of a diametrically expanded hose clamp. The curved surface is preferably formed in the shape of a plate not extending over a large angle. Moreover, it preferably has two or more attaching projections as described above.

[Holding Arms]

The holding arms are parts for holding a hose for the preliminary fixing of a diametrically expanded hose clamp on that portion of the hose at which it is to be clamped. The holding arms protrude from two lateral edges of the holder base (from two edges spaced apart along the axis of a hose forming a sub-assembly). They protrude from each lateral edge of the holder base to both sides along the outer periphery of a hose forming a sub-assembly to form a pair of opposed arcs. Accordingly, there are a total of four holding arms.

Each pair of opposed holding arms define an arcuate inner peripheral surface extending along a circumference A having a diameter that is somewhat smaller than the outside diameter of a hose forming a sub-assembly. Therefore, the holding arms are elastically held against the outer periphery of a hose in a sub-assembly. The "circumference A having a diameter that is somewhat smaller than the outside diameter of a hose" is not limited, but may, for example, be a circumference having a diameter that is equal to about 85 to 97% of the outside diameter of a hose, or a circumference having a diameter that is smaller by about 0.5 to 3 mm than the outside diameter of a hose.

It is preferable to construct the holding arms so that their clamping force for a hose in a sub-assembly may not be lowered by the holder base. Accordingly, it is preferable to form the holding arms in a separate form in a somewhat laterally spaced relation from the holder base without having them protrude directly from the holder base. It is also preferable to bring the holding arms, including their base portions, into intimate contact with the outer periphery of a hose in a sub-assembly, while engaging the holder base with the outer periphery of a hose clamp. Accordingly, it is preferable to form the base portions of the holding arms with an inner peripheral surface differing in height from the inner peripheral surface of the holder base by the thickness of a ring in a hose clamp.

Each holding arm has a sharp projection B1 formed on the inner peripheral surface of its distal end and directed substantially toward the center of the circumference A, or more inwardly than it. Although the sharp projection B1 may be a relatively high projection, it is preferably a small projection having a height that is substantially equal to the depth of a depression that may be formed in an outer rubber or elastomer layer of a hose when it is pressed against it, for the reason as stated before in connection with the eighth aspect of this invention.

Each holding arm is preferably formed with a relatively small width and/or thickness so as not to have any excessively high spring strength. For example, it is preferably formed with a width smaller than that of the holder base, and/or, with a width and/or thickness becoming smaller toward its distal end. In either event, it is still more preferable for the holding arms to satisfy at least one of the conditions as set forth at a) to c) below.

a) Each pair of opposed holding arms form an arc (having an angle) ranging from 280° to 320°, preferably from 300° to 310°. The opposed holding arms are required to have a gap between their distal ends to enable the forced insertion of the clamp holder about a hose. According to this invention, however, the clamp holder is easy to insert about a hose even if the gap may have a small width as stated above, since the holding arms do not have any excessively high spring strength. The small width of the gap enhances the effectiveness of the inwardly directed sharp projections B1 in retaining the clamp holder in position.

b) Each holding arm is provided at its distal end with a guide protruding radially outwardly of the circumference A. The distal end of the guide preferably has such a height that it does not protrude above the outer periphery of a hose clamp, including its grip portions, in a sub-assembly. The advantage of this point has been stated before in connection with the fourth and fifth aspects of this invention. The presence of the guides for the forced insertion of the clamp holder about a hose is particularly effective when the gap between the distal ends of the opposed holding arms has a small width.

c) Each holding arm has a sharp projection B2 formed on its inner peripheral surface toward its base end and directed substantially toward the center of the circumference A or more outwardly than it. The projection B2 on each holding arm is preferably situated substantially diagonally of the projection B1 on the opposite holding arm on the circumference A. If such is the case, the sharp projections B1 produce a very satisfactory result in retaining the clamp holder in position. Moreover, the sharp projections B1 and B2 cooperate to produce a satisfactory result in retaining the clamp holder against any displacement by making up for the relatively low spring strength of the holding arms. They are particularly effective for preventing any rotational displacement of the hose clamp about a hose. Although each sharp projection B2 may also be a relatively high projection, it is preferably a small projection having a height that is substantially equal to the depth of a depression that may be formed in an outer rubber or elastomer layer of a hose when it is pressed against it, for the same reason as stated before in connection with the sharp projection B1.

[Method for the Preliminary Fixing of a Hose Clamp]

When the clamp holder according to this invention is used, the preliminary fixing of a hose clamp on a hose to be joined with a pipe is carried out by a first and a second step as described below.

First step: A diametrically expanded hose clamp is inserted about a hose at one end thereof, and positioned in a selected hose portion expected to form a joint with a pipe.

Second step: The clamp holder is forced into diametrical insertion about the hose clamp and hose. The projections on the holder base engage in the holes or slots of the hose clamp and the holding arms hold the outer peripheral surface of the hose.

The clamp holder is usually unnecessary after a pipe joining process is over, or after the hose clamp is tightened about the hose joined with a pipe. Then, the clamp holder can be removed from the hose clamp for collection and reuse.

EMBODIMENTS (Clamp Holder)

A clamp holder according to a preferred embodiment of this invention will now be described with reference to FIGS. 9 to 11C. The technical scope of this invention is, however, not limited by this embodiment.

Figure 9:
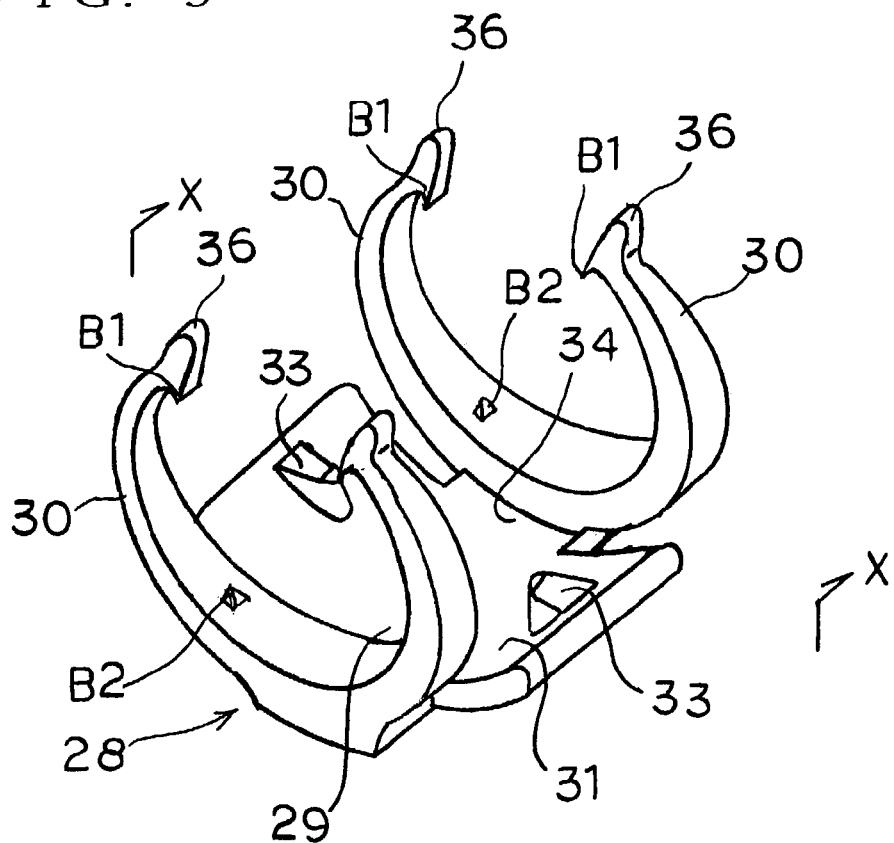
FIG. 9 shows a clamp holder embodying this invention.
Figure 10:
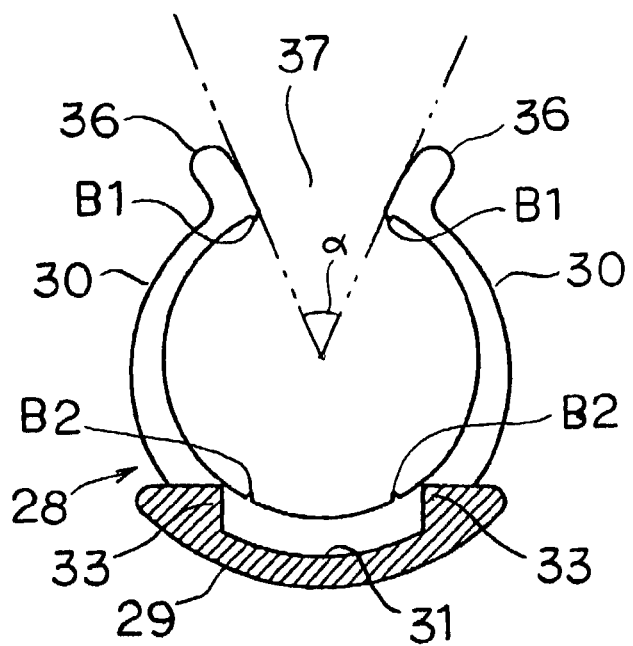
FIG. 10 is a cross sectional view taken along the line X—X in FIG. 9.

The clamp holder 28 shown in FIG. 9 is an integrally molded product of a plastic material. The clamp holder 28 has a holder base 29 in the form of a curved plate and a total of four holding arms 30 protruding from a pair of opposite edges of the holder base 29. The holder base 29 has an inner curved surface 31 so shaped as to engage intimately with the outer periphery of a diametrically expanded hose clamp 32, as shown in FIG. 11B. Moreover, the curved surface 31 has two appropriately situated positioning projections 33 that can engage in the slots or holes (not shown) of the hose clamp 32.

The holding arms 30 protrude from a base formed by an arm support portion 34 extending to some extent from each of a pair of lateral (or axially spaced) edges of the holder base 29 so as to define a pair of opposed arcs. There is a difference in height corresponding to the thickness of the ring portion of the hose clamp 32 between the inner curved surface 31 of the holder base 29 and the inner peripheral surface of the bottom of the holding arms 30. All of the holding arms 30 have a small width as compared with the holder base 29, and has a width and thickness becoming smaller toward their distal ends. Each pair of holding arms 30 defining opposed arcs have an inner peripheral surface so formed as a whole as to extend along an imaginary circumference A (not shown) having a diameter that is somewhat smaller than the outside diameter of a hose 35.

Each holding arm 30 is provided at its distal end with a sharp projection B1 on its inner peripheral surface and a guide 36 for insertion protruding from its outer peripheral surface. The sharp projection B1 is directed more inwardly than substantially toward the center of the circumference A, and is a projection that is small enough to sink or be hidden in a rubbery material. The guide 36 has such a height that it does not protrude outwardly of the hose clamp 32 in a sub-assembly as shown in FIG. 11B. Each holding arm 30 also has a sharp projection B2 formed on its inner peripheral surface near its base end, directed more outwardly than substantially toward the center of the circumference A and having a height substantially equal to that of the projection B1.

Each pair of holding arms 30 forming arcs define a gap 37 having a specific width between their distal ends. If the width of the gap 37 is expressed by an open angle $\alpha$ on the circumference A, $\alpha=50°$. This open angle is considerably small as compared with the open angles of the openings in the known clamp holders described before.

The clamp holder 28 embodying this invention and described above is used as shown in FIGS. 11A to 11C. The hose 35 is first inserted through the hose clamp 32 held in its diametrically expanded form by a pin 38, as shown in FIG. 11A. Then, the clamp holder 28 is forced into diametrical insertion about the hose 35 and the hose clamp 32 with the aid of the guides 36. Its insertion is easy, since the holding arms 30 having a small width and thickness easily open elastically, though their gap 37 is narrow. The sharp projections B1 do not damage the hose 35 during such insertion, since they are inwardly directed. Thus, the hose 35, hose clamp 32 and clamp holder 28 form a sub-assembly, as shown in FIG. 11B.

It is generally feared that in such a sub-assembly, the contact of the clamp holder with another object may cause it (and eventually the hose clamp) to slip off, or undergo axial displacement along the hose, or rotational displacement about it. The device embodying this invention is, however, unlikely to have any such problem caused easily by any of the guides 36 on the holding arms 30, since the guides 36 do not protrude outwardly of the hose clamp 32. The clamp holder 28 is unlikely to slip off easily, since the gap between the distal ends of the holding arms 30 has an open angle of as small as 50° and the inwardly directed sharp projections B1 are present. The displacement of the clamp holder 28 (particularly its rotational displacement about the hose) is unlikely to occur easily, since the inwardly directed sharp projections B1 and the outwardly directed sharp projections B2 make indenting engagement with the hose 35 in opposite directions. The hose 35 is held by its surface contact with the inner peripheral surfaces of the holding arms 30, as well as by the indenting engagement of the sharp projections B1 and B2, since they are each a projection that is small enough to sink or be hidden in a rubbery material. This also makes the slipping or displacement of the clamp holder 28 unlikely to occur easily.

The hose 35 is transferred to a pipe joining process in the form of a sub-assembly as described above, and after the hose 35 is joined with a pipe (not shown), the pin 38 is removed to allow the hose clamp 32 to tighten the joint of the hose with the pipe, as shown in FIG. 11C.

While the preferred embodiments have been described, variations thereto will occur to those skilled in the art within the scope of the present inventive concepts which are delineated by the following claims.

What is claimed is:

1. In combination, an annular hose clamp and a clamp holder defining a subassembly for fixing the hose clamp on a hose in a position to be clamped to a pipe,
    said hose clamp adapted to be preliminarily fixed on said hose, when said hose is in said position, in a diametrically expanded condition,
    said clamp holder comprising a holder base and four separately constructed holding arms formed from an elastically deformable material,
        the holder base is positioned on the outer periphery of the annular hose clamp, and
        the four separately constructed holding arms protruding from a pair of lateral edges of the holder base and forming opposed arcs lying along a circumference having a diameter somewhat smaller than the outside diameter of the hose,
    each of the four separately constructed holding arms having a guide for securing the clamp holder to the hose clamp, protruding from an outer peripheral surface of the holding arm and having a height such that the guide does not protrude outwardly of said hose clamp in said sub-assembly when said hose clamp is in the diametrically expanded condition.

2. The annular hose clamp and the clamp holder according to claim 1, wherein the holder base and holding arms of the clamp holder are formed from the same elastically deformable material.

3. The annular hose clamp and clamp holder according to claim 1, wherein the elastically deformable material is a plastic material, or steel.

4. The annular hose clamp and the clamp holder according to claim 1, wherein the holder base of the clamp holder has at least one positioning projection that is engageable in a hole and/or a slot in the hose clamp.

5. The annular hose clamp and the clamp holder according to claim 1, wherein the hose clamp and the clamp holder is for use with the hose of an oil, fuel, refrigerant or air hose adapted to be on a motor vehicle.

6. The annular hose clamp and the clamp holder according to claim 1, wherein the holder base of the clamp holder has a curved surface that can be brought into intimate contact with the outer periphery of the hose clamp in said diametrically expanded condition.

7. The annular hose clamp and the clamp holder according to claim 1, wherein each of the holding arms of the clamp holder is formed with a width smaller than that of the holder base, and/or with a width and/or thickness becoming smaller toward a distal end.

8. The annular hose clamp and the clamp holder according to claim 1, wherein each pair of opposed holding arms of the clamp holder defines an arc having an angle ranging from 280° to 320°.

9. The annular hose clamp and the clamp holder according to claim 1, wherein each of the holding arms of the clamp holder has a sharp projection formed on its inner peripheral surface toward a base portion and directed substantially toward the center of the circumference or more outwardly than it.

10. The annular hose clamp and the clamp holder according to claim 9, wherein the sharp projection is a projection having a height substantially equal to the depth of depression formed in an outer rubber or elastomer layer of the hose when the projection is pressed against the layer.

11. The annular hose clamp and the clamp holder according to claim 1, wherein each of the holding arms of the clamp holder has a first sharp projection formed on an inner peripheral surface of a distal end and directed substantially toward the center of the circumference or more inwardly than it, and also has a second sharp projection formed on the inner peripheral surface toward a base portion and directed substantially toward the center of the circumference or more outwardly than it, wherein the second projection on each of the opposed holding arms is situated substantially diagonally of the first projection on the other holding arm on the circumference.

12. The annular hose clamp and the clamp holder according to claim 1, wherein each of the holding arms of the clamp holder has a sharp projection formed on an inner peripheral surface of the distal end and directed substantially toward the center of the circumference or more inwardly than it.

13. The annular hose clamp and the clamp holder according to claim 12, wherein the sharp projection is a projection having a height substantially equal to the depth of depression formed in an outer rubber or elastomer layer of the hose when the projection is pressed against the layer.

14. In combination, an annular hose clamp, a clamp holder for fixing the hose clamp in position on a hose, and the hose:
   said hose at least partially disposed within the clamp holder,
   said hose clamp at least partially dispose within the clamp holder, and
   said clamp holder comprising a holder base and holding arms formed from an elastically deformable material, wherein:
   (a) the holder base is so constructed as to be capable of being positioned on the outer periphery of the hose clamp, and
   (b) the holding arms consist of a pair of holding arms protruding from each of a pair of lateral edges of the holder base and forming opposed arcs lying along a circumference having a diameter somewhat smaller than the outside diameter of the hose,
      (i) inner surface portions of the opposed arcs of the holding arms forming edges with adjacent inner surface portions of distal ends of the holding arms,
      (ii) the edges defining an angle between the inner surface portion of the distal end of each of the holding arms and the adjacent inner surface portion of the opposed arc of the holding arm,
      (iii) each edge forming a sharp projection on the inner peripheral surface of the distal end of each holding arm, directed substantially toward the center of the circumference or more inwardly than the center of the circumference, and
      (iv) each holding arm having a guide for insertion, which protrudes from an outer peripheral surface and has a height such that the guide does not protrude outwardly of said hose clamp.

15. The clamp holder and the hose according to claim 14, wherein the sharp projection is a projection having a height substantially equal to the depth of depression formed in an outer rubber or elastomer layer of the hose when the projection is pressed against the layer.

16. In combination, a hose clamp and a clamp holder for fixing said hose clamp in position on a hose:
   said hose clamp at least partially disposed within the clamp holder, and
   said clamp holder comprising a holder base and holding arms formed from an elastically deformable material, wherein:
   (a) the holder base being positioned on the outer periphery of the hose clamp, and
   (b) the holding arms being a pair of holding arms protruding from each of a pair of lateral edges of the holder base and forming opposed arcs lying along a circumference,
      (i) inner surface portions of the opposed arcs of the holding arms forming edges with adjacent inner surface portions of distal ends of the holding arms,
      (ii) the edges defining an angle between the inner surface portion of the distal end of each of the holding arms and the adjacent inner surface portion of the opposed arc of the holding arm,
      (iii) each edge forming a sharp projection on the inner peripheral surface of the distal end of each holding arm, directed substantially toward the center of the circumference or more inwardly than the center of the circumference, and
      (iv) each holding arm having a guide for insertion, which protrudes from an outer peripheral surface and has a height such that the guide does not protrude outwardly of said hose clamp.

17. A system to clamp a hose enveloping a pipe, comprising:
   an annular hose clamp having a diametrically expanded position and a contracted position and designed to be disposed on the hose in the diametrically expanded position; and
   a clamp holder comprising:
      a holder base having a pair of lateral edges and positioned on an outer periphery of the annular hose clamp; and
      a pair of holding arms protruding from each of a pair of the lateral edge of the holder base and forming opposed arcs lying along a circumference, wherein the circumference has a diameter smaller than an outside diameter of the hose, wherein each holding arm is formed from an elastically deformable material and comprises:
      an insertion guide protruding from an outer peripheral surface of each holding arm and having a height less than or equal to a distance between an outer diameter of the annular hose clamp in the diametrically expanded position and an outer diameter of the hose such that each of said insertion guide does not protrude outwardly of said hose clamp in said diametrically expanded position.

18. The system according to claim 17, wherein each holding arm further comprises a sharp projection formed on an inner peripheral surface of a distal end of the holding arm and directed at least one of substantially toward a center of the circumference and more inwardly than the center of the circumference.

19. The clamp holder and the hose clamp according to claim 16, wherein:
   the inner peripheral surface of each of the holding arms having at a base portion a height that is higher than the inner peripheral surface of the holder base by a difference corresponding to the thickness of a ring portion of the hose clamp.

* * * * *